US00RE34207E

United States Patent [19]

[11] E

Patent Number: Re. 34,207

Nelson et al.

[45] Reissued Date of Patent: Mar. 30, 1993

[54] COUNTERROTATING AIRCRAFT PROPULSOR BLADES

[75] Inventors: Joey L. Nelson; Sidney B. Elston, III, both of Cincinnati; Wu-Yang Tseng, West Chester; Martin C. Hemsworth, Cincinnati, all of Ohio

[73] Assignee: General Electric Company, Cincinnati, Ohio

[21] Appl. No.: 660,459

[22] Filed: Feb. 26, 1991

Related U.S. Patent Documents

Reissue of:

[64] Patent No.: 4,784,575
Issued: Nov. 15, 1988
Appl. No.: 157,179
Filed: Feb. 12, 1988

U.S. Applications:

[63] Continuation of Ser. No. 932,427, Nov. 19, 1986, abandoned.

[51] Int. Cl.[5] ..... F01D 5/14

[52] U.S. Cl. ..... 416/226; 416/144; 416/224; 416/233; 416/DIG. 2

[58] Field of Search ..... 416/224, 226, 230, 233, 416/144, 145, DIG. 2, 223 R, 223 A, DIG. 5

[56] References Cited

U.S. PATENT DOCUMENTS

| | | | |
|---|---|---|---|
| 2,306,177 | 12/1942 | Mattson | 416/233 |
| 2,312,219 | 2/1943 | Sensenick | 416/224 |
| 2,541,661 | 2/1951 | Palmatier et al. | 416/233 |
| 2,698,666 | 1/1955 | Camping et al. | 416/233 |
| 3,085,631 | 4/1963 | Dagrell | 416/233 |
| 3,103,977 | 9/1963 | Negroni | 416/145 |
| 3,664,764 | 5/1972 | Davies et al. | 416/224 |
| 3,883,267 | 5/1975 | Baudier et al. | 416/230 |
| 3,903,578 | 9/1975 | Rothman | 29/156.8 |
| 4,358,246 | 11/1982 | Hanson et al. | 416/223 |
| 4,370,097 | 1/1983 | Hanson et al. | 416/228 |
| 4,407,635 | 10/1983 | Grimes et al. | 416/230 |

FOREIGN PATENT DOCUMENTS

| | | |
|---|---|---|
| 1036064 | 8/1958 | Fed. Rep. of Germany . |
| 0876961 | 11/1942 | France . |
| WO81/00243 | 2/1981 | PCT Int'l Appl. . |
| 0216177 | 3/1969 | U.S.S.R. . |
| 0662110 | 11/1951 | United Kingdom . |
| 00831380 | 3/1960 | United Kingdom . |
| 1083175 | 8/1966 | United Kingdom . |
| 1276356 | 6/1972 | United Kingdom . |
| 1330565 | 9/1973 | United Kingdom . |
| 1364006 | 8/1974 | United Kingdom . |
| 1433519 | 4/1976 | United Kingdom . |
| 2084507 | 4/1982 | United Kingdom . |
| 2170868 | 8/1986 | United Kingdom . |

*Primary Examiner*—John T. Kwon
*Attorney, Agent, or Firm*—Charles L. Moore, Jr.; Jerome C. Squillaro

[57] ABSTRACT

A propulsor blade for an aircraft engine includes an airfoil section formed in the shape of a scimitar. A metallic blade spar is interposed between opposed surfaces of the blade and is bonded to the surfaces to establish structural integrity of the b'ade. The metallic blade spar includes a root end allowing attachment of the blade to the engine.

16 Claims, 16 Drawing Sheets

(FORE)

| SECT | SECT HEIGHT TH(M) BASIC | TWIST ANGLES | | THICKNESS | | | OVERALL CHORD LG CH +.015 | LEAD. EDGE MinRad LE Ref | TRAIL. EDGE RADIUS TE Ref |
|---|---|---|---|---|---|---|---|---|---|
| | | TAN TT ± 0°45' | CHORD TC REF | LEAD. TL ±.005 | MAX TM ±.005 | TRAIL TU ±.005 | | | |
| A-A | ---- | 20° 15' | 19° 56' | .399 | 1.934 | .247 | 17.711 | .036 | .087 |
| B-B | 4.026 | 19° 21' | 19° 9' | .324 | 1.475 | .200 | 17.891 | .030 | .073 |
| C-C | 8.052 | 21° 16' | 21° 12' | .238 | 1.003 | .154 | 17.967 | .024 | .059 |
| D-D | 12.078 | 24° 43' | 24° 43' | .166 | .673 | .119 | 17.935 | .020 | .047 |
| E-E | 16.104 | 27° 41' | 27° 42' | .132 | .540 | .098 | 17.699 | .018 | .038 |
| F-F | 20.130 | 30° 12' | 30° 13' | .123 | .508 | .086 | 17.123 | .017 | .031 |
| G-G | 24.155 | 32° 40' | 32° 42' | .113 | .446 | .079 | 16.201 | .016 | .029 |
| H-H | 28.181 | 35° 07' | 35° 12' | .097 | .352 | .073 | 15.060 | .014 | .028 |
| J-J | 32.187 | 37° 30' | 37° 36' | .085 | .284 | .071 | 13.803 | .013 | .029 |
| K-K | 36.233 | 39° 55' | 40° 4' | .080 | .237 | .069 | 11.980 | .012 | .028 |
| L-L | 38.246 | 41° 16' | 41° 26' | .079 | .213 | .070 | 10.693 | .011 | .028 |
| M-M | 40.081 | 43° 39' | 43° 52' | .077 | .189 | .071 | 8.890 | .010 | .028 |
| N-N | 40.952 | 45° 31' | 45° 42' | .080 | .180 | .072 | 7.710 | .009 | .029 |

FIG. 4A (AFT)

| SECT | SECT HEIGHT TH(M) BASIC | TWIST ANGLES | | THICKNESS | | | CHORD LG CH +.015 | EDGE MinRad LE Ref | EDGE RADIUS TE Ref |
|---|---|---|---|---|---|---|---|---|---|
| | | TAN TT + 0°45' | CHORD TC REF | LEAD. TL +.005 | MAX TM +.005 | TRAIL TU ±.005 | | | |
| A-A | ---- | 26° 46' | 26° 30' | .376 | 1.928 | .256 | 17.610 | .033 | .089 |
| B-B | 3.959 | 25° 06' | 24° 59' | .305 | 1.472 | .202 | 17.875 | .028 | .073 |
| C-C | 7.919 | 26° 38' | 26° 38' | .232 | 1.030 | .157 | 17.972 | .024 | .059 |
| D-D | 11.878 | 29° 11' | 29° 12' | .179 | .785 | .124 | 17.902 | .020 | .047 |
| E-E | 15.838 | 31° 08' | 31° 9' | .147 | .637 | .102 | 17.683 | .018 | .038 |
| F-F | 19.797 | 32° 41' | 32° 41' | .127 | .530 | .087 | 17.169 | .017 | .031 |
| G-G | 23.756 | 34° 09' | 34° 10' | .111 | .433 | .078 | 16.266 | .016 | .029 |
| H-H | 27.716 | 35° 36' | 35° 40' | .096 | .349 | .073 | 15.143 | .014 | .028 |
| J-J | 31.675 | 37° 03' | 37° 11' | .086 | .285 | .070 | 13.854 | .013 | .029 |
| K-K | 35.635 | 38° 49' | 38° 58' | .080 | .236 | .069 | 11.952 | .012 | .028 |
| L-L | 37.614 | 39° 57' | 40° 8' | .078 | .212 | .070 | 10.637 | .011 | .029 |
| M-M | 39.174 | 41° 19' | 41° 32' | .077 | .192 | .071 | 9.008 | .010 | .028 |
| N-N | 40.177 | 42° 26' | 42° 39' | .079 | .179 | .073 | 7.605 | .009 | .028 |

FIG. 4B 106
332
320
300
318
307
309
326
328
324
330
SECT S-S 312
326
332
327
SECT Y-Y (F5)

301
344
342
343
302
345
340
344
VIEW AF-AF (F7)

300
304
340
AD
AD
350
VIEW AC-AC

SECT AB-AB (D12)

SECT X-X (D12)

SECT W-W (D12)

SECT V-V (D12)

FORESPACE

SECT U-U (C12)

SECT T-T (B12)

SECT S-S

SECT AG-AG (BII)
FORESPAR

SECT X-X (D10)

SECT W-W (D10)

SECT V-V (D10)

SECT U-U (D8)

SECT T-T (C10)

SECT S-S (B10)

SECT BD-BD (C11)

SECT BC-BC (C10)

SECT BB-BB (C10)

SECT BL-BL (B10)

COUNTERROTATING AIRCRAFT PROPULSOR BLADES

Matter enclosed in heavy brackets [ ] appears in the original patent but forms no part of this reissue specification; matter printed in italics indicates the additions made by reissue.

The invention herein described was made in the performance of work under a NASA contract and is subject to the provisions of Section 305 of the National Aeronautics and Space Act of 1958, Public Law 85-568 (72 Stat. 435; 42 USC 2457).

This is a continuation of application Ser. No. 932,427 filed Nov. 19, 1986 now abandoned.

BACKGROUND OF THE INVENTION

1. Field of the Invention

This invention relates to aircraft propulsion systems and more specifically, to an aircraft propulsor system having counterrotating, highly swept, wide chord, very thin propulsor blades which are constructed primarily of composite materials.

2. Background Discussion

The basic aircraft propeller normally includes two or more blades connected to a central hub being driven by an aircraft power plant. The propeller pulls the airplane through the air by generating thrust obtained by the action of the rotating blades on the air. The propeller is generally described by reference to the leading edge (the first edge to cut into the air), the trailing edge (the last edge to contact the air), the front side or face, and the back or chambered side.

The propeller system contemplated in this invention is a counterrotating propeller system having a fore propeller with fice to fifteen blades and a counterrotating aft propeller with from five to fifteen blades.

Previous propeller blade designs were adequate for low speed flight. However, numerous structural problems causing decreased performance result when these blades are used at high (near supersonic) rotational velocities. The structural problems for a blade operating at a very high speed result from the centrifugal and air turbulence forces and stresses acting on the blade.

One force acting on a blade in flight is a thrust force caused by air reacting against the blade parallel to the direction of advance. This thrust force produces a bending stress or torque in the blade. Another force is the centrifugal force caused by the rotation of the propeller tending to throw the blade radially outward from the axis of rotation. Centrifugal force produces tensile stresses in the blade. Centrifugal force produces tensile stresses in the blade. Another force acting on the blades is a torsional force caused by the air flow along edges of the blade producing a twisting force on the blade. This torsional force produces torsional stress in the blade. Thus, the primary stresses acting on a blade rotating at high speeds are bending stresses, tensile stresses, and torsional stresses.

The bending stresses bend the blade forward as the airplane is moved through the air by the propeller. Tensile stresses stretch the blade. Torsional stresses twist the blade. Additionally, torsional stresses are produced in rotating blades by two twisting moments, i.e., the aerodynamic twisting moments and the centrifugal twisting moment. The air reaction on the blade causes the aerodynamic twisting moment and the centrifugal force causes the centrifugal twisting moment. During ordinary propeller operation, the torsional forces tend to twist the blade to a lower blade angle resulting in blade inefficiency. Additionally, air turbulence generated by a fore propulsor in a counterrotating propeller system creates additional forces and stresses on the aft propulsor. In addition to the requirements for normal operation, the blade must be able to withstand impact with foreign objects such as birds and gravel.

High speed propulsors must be capable of withstanding aditional stresses at very high propulsor tip speeds. Then the tip of a propeller blade travels at a rate of speed which approaches the speed of sound (i.e., Mach 1.0), flutter of vibration causes other stresses to develop. If only a section of the blade exceeds the speed of sound, a shock wave can be generated and drastically decrease blade performance.

One method of overcoming the shock wave problem is by sweeping the leading and trailing edges of the blade so that the net airflow vector is less than Mach 1.0 even at high speeds. Sweeping the blade indicates a bending of the blade axially with respect to the aircraft direction of travel so that the leading edge trails behind a radially inward section of the leading edge and so that the trailing edge trails behind a radially inward region of the trailing edge. For example, U.S. Pat. No. 3,989,406 describes a swept blade for reducing leading edge shock in transonic and supersonic rotor blades inturbofan engines by sweeping the leading edge. Basically, for a swept blade the airspeed vector is the sum of the perpendicular airspeed vector and the tangential vector. The tangential vector is ignored for most purposes. Therefore, blade sweeping deceases the net airspeed vector below supersonic speed.

A structural solution to the blade stress problem has been the development of fiber reinforced resin-bonded structural composite materials. These materials have created a new design flexibility for propellers. There are three major advantages to the application of fiber reinforced composites. First, complex airfoil configurations can be shaped. Second, composite materials creates weight savings. Third, the dynamic frequencies and structural responses of the blade element can be tailored to its operating parameters. The present invention overcomes the problems and disadvantages of the prior art by providing a swept propeller blade comprised of composite materials having the strength and airfoil configuration to provide an efficient blade for a counterrotating propeller system.

SUMMARY OF THE INVENTION

It is an object of the present invention to overcome the deficiencies of the prior art by providing an improved counterrotating aircraft propeller system having highly swept, wide chord, thin blades for operating at transonic and supersonic speds.

It is another object of the present invention to provide an efficient propeller blade comprised of fiber reinforced resin bonded structural composite materials.

It is an object of the present invention to provide a counterrotating aircraft propeller blade which overcomes the forces and stresses which blades are subjected to at high speeds.

It is another object of the present invention to provide a counterrotating aircraft propeller blade which improves the efficiency of a counterrotating propeller system.

It is yet another object of the present invention to provide a blade that is radially and chordwise balanced for achieving a balanced blade.

In general, the aircraft propulsor system comprises a plurality (more than four blades) of highly loaded variable pitch propulsors having swept blades with relatively thin airfoil section. The blades have a large axial sweep for high subsonic flight speeds. The propulsor system includes a first stage (fore) propulsor and a coaxial counterrotating second stage (aft) propulsor. A typical blade of the propulsion system includes an airfoil section having a tip end, a root end, a first and second surface therebetween intersecting in a convex leading edge and a concave trailing edge. The first surface being essentially convex and the second surface being essentially concave. The first surface formed from a first blade shell and the second surface from a second blade shell. Each shell is formed of a plurality of angle plied composite laminates bonded together. Each shell is made by shaping each layer of composite laminate to a pattern representative fan area of constant thickness for the cross section of the blade for each surface. A metallic blade spar interposed between the first and section shell is bonded to the shells for connecting the shell surfaces to the root end and for providing stiffening of the blade. Foam filled airfoil cavities are created interposed between the first and second shells for decreasing the weight of the blade. A metallic plate sheath is bonded to the leading edge for preventing erosion and providing lightning protection.

In particular, he metallic blade spar includes a tip end, a leading edge, a trailing edge, a dovetail, a fore undercut cavity, a plurality of cavities inside the blade spar and positionally adjustable counterweights in the blade spar fore and aft of the dovetail. The counterweights provide static balancing of the blade in a radial direction and a chordwise direction. The cavities and undercuts decrease the weight of the blade. In one form of the invention, a pocket cavity is covered with a cover plate to form a blind cavity. The cover plate and undercuts provide airfoil rigidity and extra adhesive surface for the angle plied composite laminates, In another form of the invention, a plurality of spar cavities are formed inside the blade.

A nickel plate sheath is attached to the leading edge for protecting the edge. A plastic polyurethane film is applied to the outer surface of the blade for protection.

BRIEF DESCRIPTION OF THE DRAWINGS

FIGS. 4A and 4B contains tables describing the geometric dimensions of a fore and aft blade;

DETAILED DESCRIPTION OF A PREFERRED EMBODIMENT

1. General Description

Figure 1:
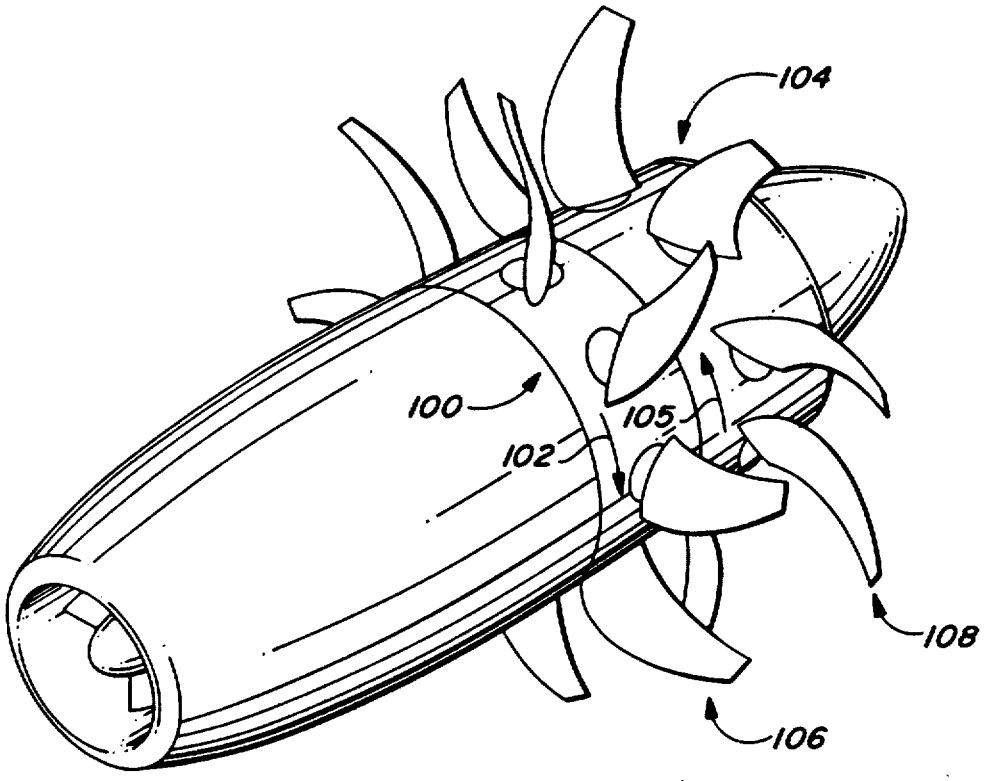
FIG. 1 illustrates a counterrotating propulsor system of the present invention.

FIG. 1 illustrates a counterrotating propulsor system of the present invention. In general, a first propulsor 100 including fore blade 106 rotates in one direction 102 while a coaxial aft propulsor 104 including aft blade 108 rotates in an opposite direction 105. All blends on fore propulsor 100 are identical, all blades on the aft propulsor 104 are identical, but the fore blades and the aft blades differ from each other in dimensions.

Figure 2:
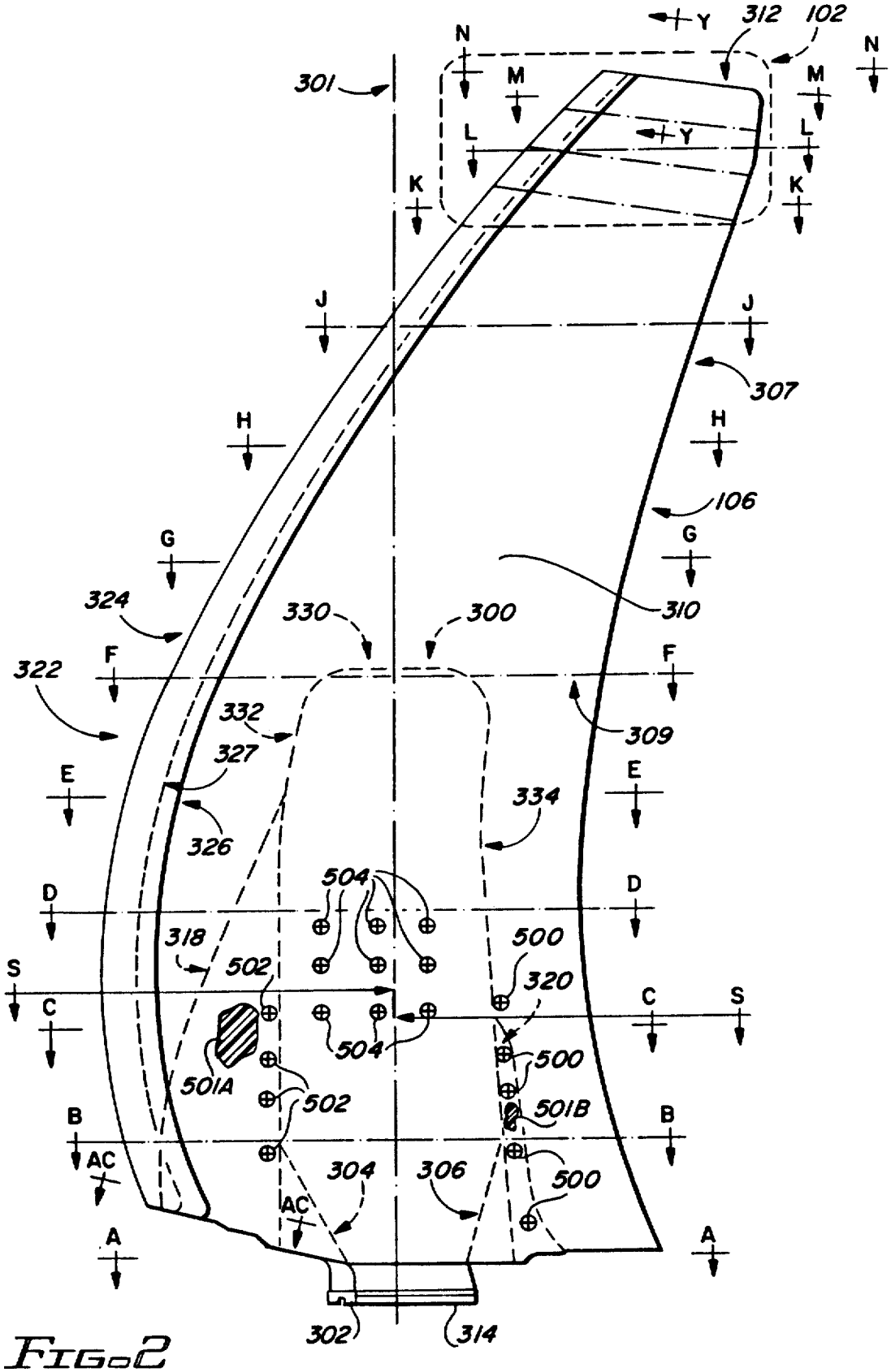
FIG. 2 shows the structure of a fore blade.
Figure 3A:
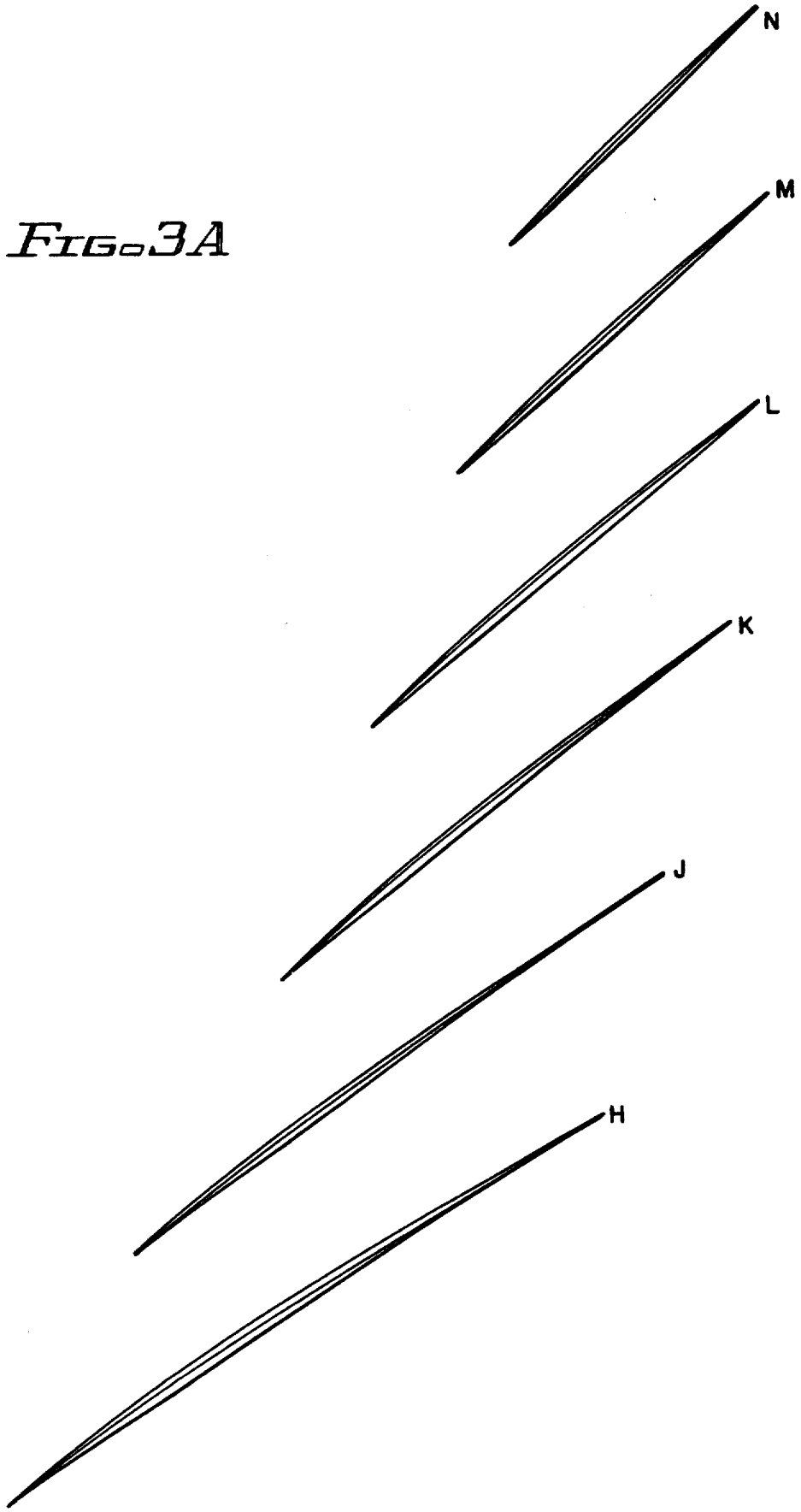
FIGS. 3A, 3B, illustrate cross sections of a fore blade taken at intervals A–N.
Figure 3B:
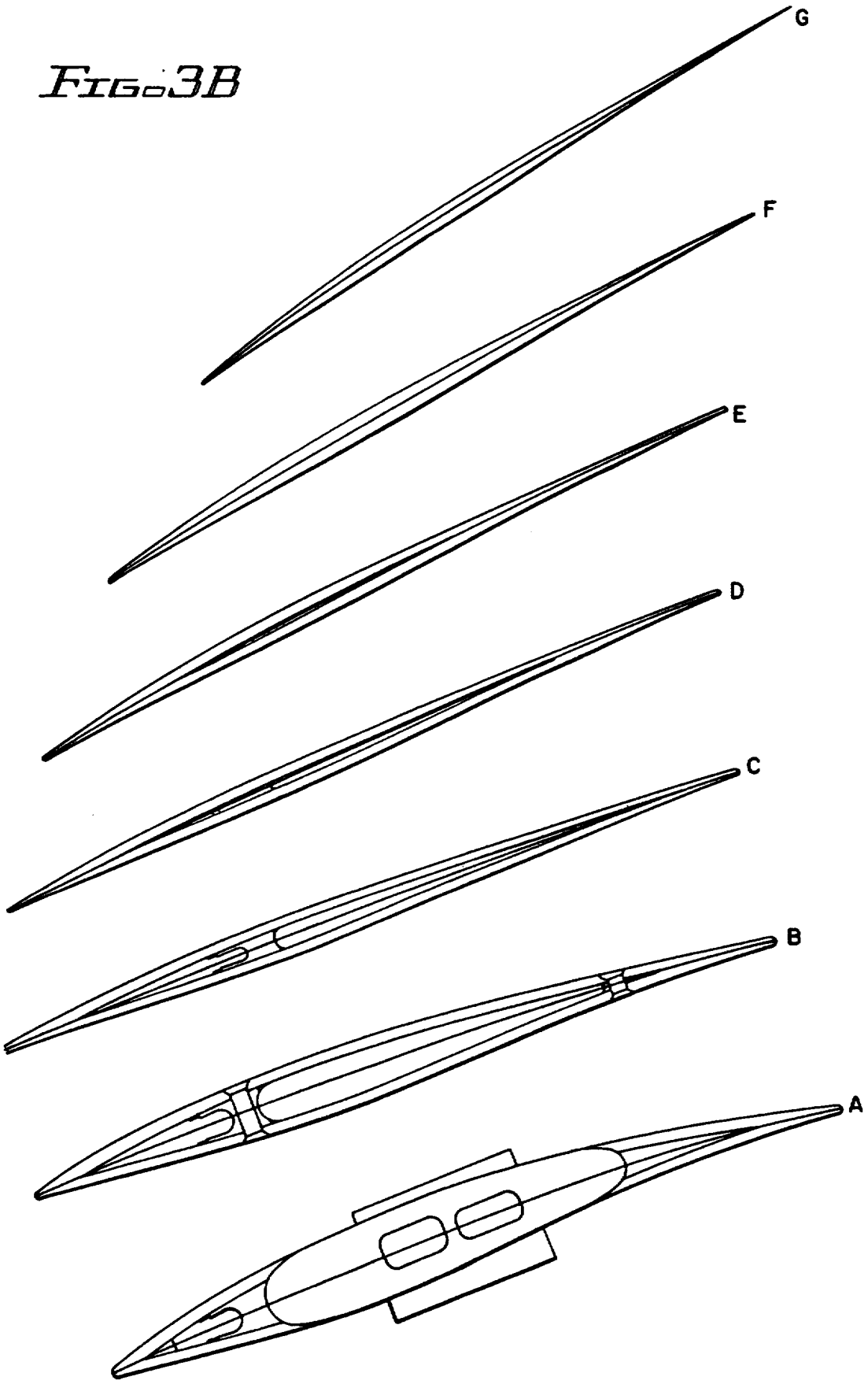
Figure 5:
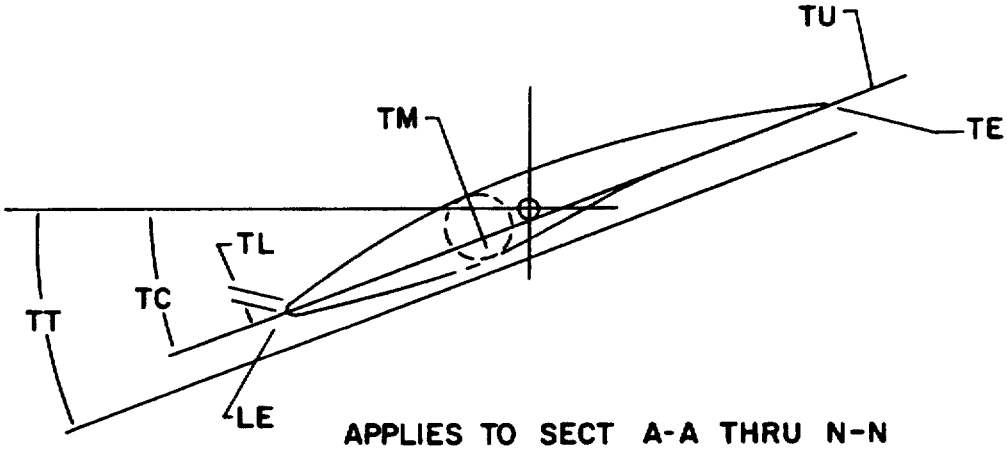
FIG. 5 is a schematic diagram of the blade describing the airfoil geometry of a typical blade.

The structure of a typical fore blade 106 is shown in FIG. 2. The stacking axis 301 is used as a reference axis. FIG. 3 shows cross-sections of the blade taken at various stations. For example section F—F in FIG. 3 is taken along line F—F in FIG. 2. Each section is defined by several parameters listed in FIGS. 4A and 4B. FIG. 4A refers to a typical fore blade 106, while FIG. 4B refers to a typical aft blade 108 in FIG. 13. The section numbers in the first column correspond to the section numbers shown i n FIGS. 2-3. Dimensions are are given in inches.

Figure 8:
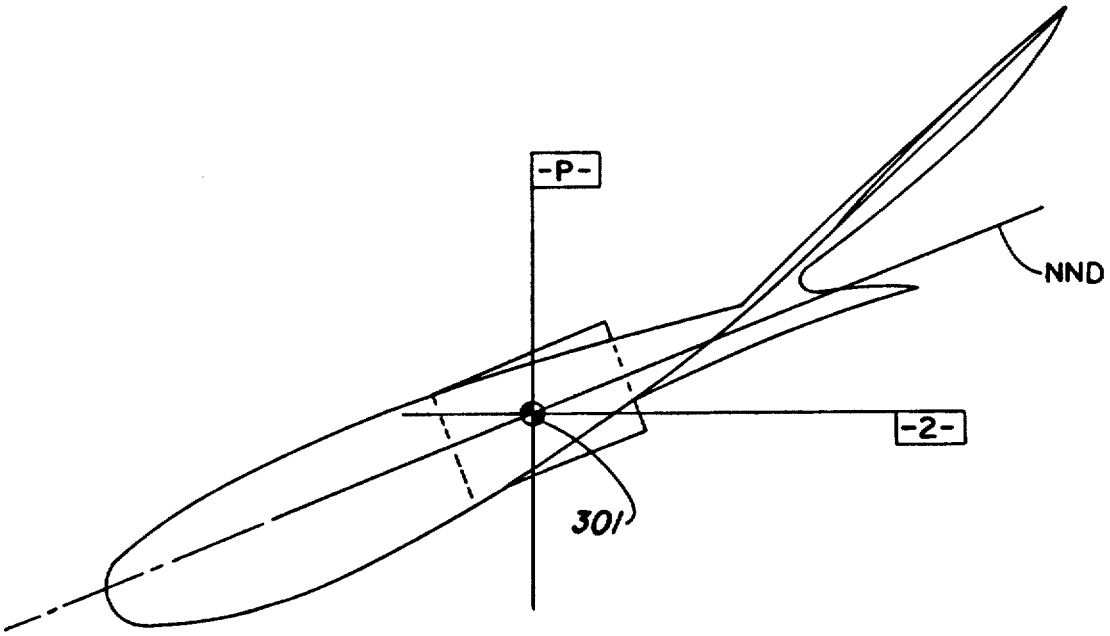
FIG. 8 is a view looking along the radial axis of a typical blade.
Figure 6:
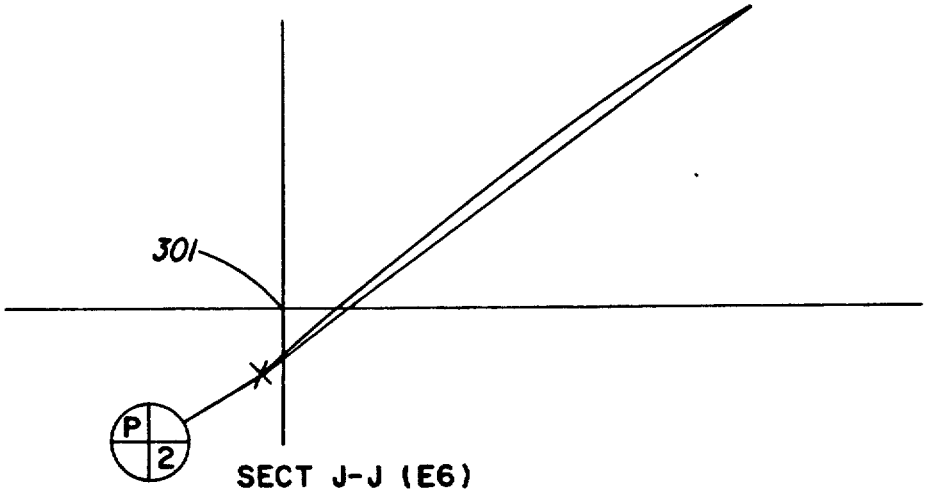
FIG. 6 is a schematic diagram of the blade showing the airfoil geometry of a midsection of a typical blade.
Figure 7:
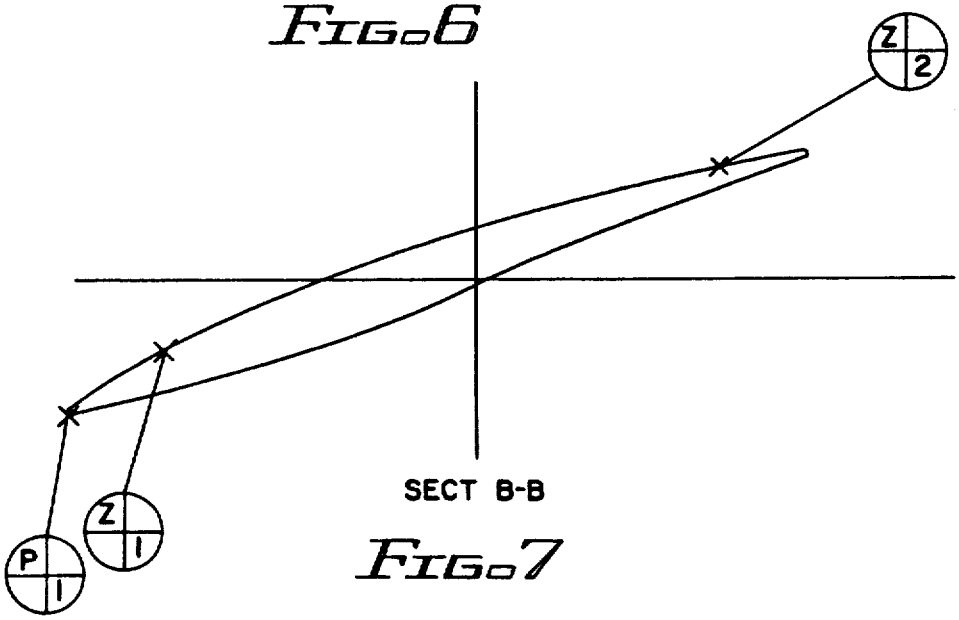
FIG. 7 illustrates the airfoil geometry of the root section of a typical blade.

The parameters of the top row of FIGS. 4A and 4B refer to airfoil geometry of the blades. Section height is the distance from a section to a predetermined point, such as section A—A of the blade. Twist angles are the twist in the blade at each section. Thickness is the thickness of the blade. The parameters such as chord, in the top row of FIGS. 4A and 4B are defined in FIG. 5, which is a generalized cross-section applicable to all sections A—A through N—N. FIGS. 4A and 4B when viewed in connection with FIGS. 5-8, are considered self-explanatory and describe the airfoil geometry of the blades 106 and 108. FIG. 6 illustrates the position of section J—J with respect to the stacking axis. FIG. 7 shows the position of section B—B with respect to the stacking axis. FIG. 8 is a view looking from the tip end to the root along the stacking axis.

2. Fore Blade

A blade, such as blade 106 of fore propulsor is illustrated in FIG 2. The blade has an airfoil section 310 including a tip end 312 and a root section 302. The airfoil section 310 includes a leading surface 309 and a trailing surface 307 between the tip end 312 and root section 302, comprised of a plurality of angle plied composite laminates of continuous fibers 40 which are embedded in a matrix material. The continuous fibers of the composite laminate extend across the entire airfoil. The leading surface 309 and trailing surface 307 intersect in a convex shaped leading edge and a concave shaped trailing edge forming a swept back blade configuration as shown in FIG. 2. The leading surface 309 and trailing surface are essentially convex. The surfaces form a composite shell in which a metallic blade spar 300 is interposed between leading shell surface 309 and trailing shell surface 307 and bonded to the shells for connecting the shell surfaces to root section 302. For added strength an adhesive such as GE-SPEC-A50TF218 is applied between spar 300 and the interior of shell 307 and 309.

Additionally, a plurality of spar fasteners 504 for clamping the shells to the blade spar 300 are inserted through the spar 300, surface 309, and surface 307. The spar fasteners 504 force the shells towards the blade spar for providing restraint against the centrifugal load of the blade, when the blade rotates. Preferably, the spar fasteners are made of a composite of S-glass and epoxy resin. Also, a plurality of fore fasteners 502 and aft fasteners 500 are inserted through surface 309 and 307 to force the shells together on the edges of spar 300. The fore and aft fasteners restrain against the bending of the blade 300 around axis 301 (a radial axis) and axis NND (a chordwise axis 8 shown in FIG. 8). Preferably, a fore or aft fastener is a countersunk nut and bolt made of a high strength alloy, such as inconel or steel. The surfaces of the fasteners are made flush with surfaces 309 and 307 for maintaining minimum drag. The fore, aft and spar fasteners separate the restraining forces, with the fore and aft fasteners providing blade bending restraint, and the spar fasteners providing centrifugal load restraint.

The fibers of the composite shell are unidirectional, side by side parallel encased in a ductile, low strength, low modulus of elasticity matrix material which transfers load from fiber to fiber through shear and localizes the effect of a single fiber failure by redistributing the load near failed fiber ends to adjacent fibers. Typical fibers are comprised of graphite, boron or S-glass material. The fibers used in the practice of this invention are a composite of 80% graphite and 20% S-glass. However, as is evident, the composite material may comprise various percentages of fiber material and different fiber material. It is to be understood that this invention is not limited to a particular composition of fiber material or matrix material. In the practice of this invention, the matrix material is epoxy resin. The laminate is layered with the fibers of each layer being aligned in an alternating pattern of −80°, −35°, 10°, −35° from radial axis 301. Note that two consecutive layers may be layered at the same angle, however when an angle is changed the above sequence is followed. This layup produces an aeroelastically stable blade with well tuned vibratory modes. The composite laminates comprises strong, stiff parallel fibers encased together in a ductile low strength, low modulus of elasticity matrix material of at least 30×10 psi. The matrix material is a thermosetting synthetic resin. The angle plied composite laminates are preferably arranged so that the parallel fibers run in alternating directions. The composite laminate have a modulus of elasticity of at least 14×10 psi.

It is to be further understood that this invention is not limited to the specific fiber pattern described above. However, as is evident, numerous fiber patterns may be used for effecting construction of the laminate.

Each blade includes a central blade spar 300 constructed of a high strength, light weight alloy, such as titanium or aluminum. A blade spar 300 includes a tip region 330, a leading edge 332, a trailing edge 334, a fore undercut cavity 304, a aft undercut cavity 306 and a dovetail 314. The spar 300 interposed between shells defined by surface 309 and 307 is bonded to the shells for stiffening and for providing load transmission from airfoil section 310 to the dovetail 324. The spar 300 has a dovetail region 302 which locks the spar into a rotating hub (not shown). The details of the dovetail design are known in the art and not considered part of the present invention.

One function of spar 300 is to provide a connection between the rest of the blade and the rotating hub. The spar has hollow undercut cavities as outlined by phantom lines 304 and 306 machined into it. Internal material is removed to create the cavities while the outer surface area of spar 300 is maintained for adhesion to the composite shell. For a better understanding of the configuration and functional cooperation of the components described briefly above, attention is directed to FIGS. 14–19 of the drawings, wherein the blade spar is illustrated in detail.

A leading edge cavity 318 outlined by phantom lines on FIG. 2 is interposed between the shells defined by surface 309 and surface 307 on the leading edge of blade spar 300. The cavity 318 is filled with a low density foam for maintaining the airfoil shape and preventing water from entering the cavity. A trailing edge cavity 320 outlined by phantom lines in FIG. 2 on the trailing edge of blades spar 300 and interposed between surfaces 307 and 309 is filled with low density foam for maintaining the airfoil shape and preventing water from entering the cavity. Cavities 318 and 3290 are formed between surfaces 309 and 307 for effecting a decrease in the weight of blade 106. Additionally, the low density foam tailors load transmission from airfoil section 310 to blade spar 300.

The leading edge 322 of the blade is covered with a nickel plate sheath 324 for preventing erosion and providing lightning strike protection. Solid line 326 corresponds to the trailing edge of sheath 324 on surface 309, while phantom line 327 corresponds to the trailing edge of sheath 324 on surface 307. The sheath 324 wider on leading surface 309 than on trailing surface 307 as shown by line 326 and phantom line 327 along leading edge 322. The extension of the leading edge protection on surface 309 provides greater protection for surface 309, since leading surface 309 cuts into the air, while trailing surface 307 does not directly impact the air during normal operation.

In general, blade 106 is swept back for reducing the noise generated at the tip 312 and for decreasing the aerodynamic losses due to compressability effects. The airfoil shape is tailored for providing maximum efficiency at a cruise condition of Mach 0.72 at 35,000 feet. While the present invention is described hereinafter with particular reference to this airfoil shape, it is to be understood that it is contemplated that the airfoil shape in accordance with the present invention may be tailored for providing maximum efficiency at other cruise conditions of the aircraft. For instance, the sweep of the blade may be altered for providing maximum efficiency at a different cruise speed.

Figures 9, 10, 11, 12:
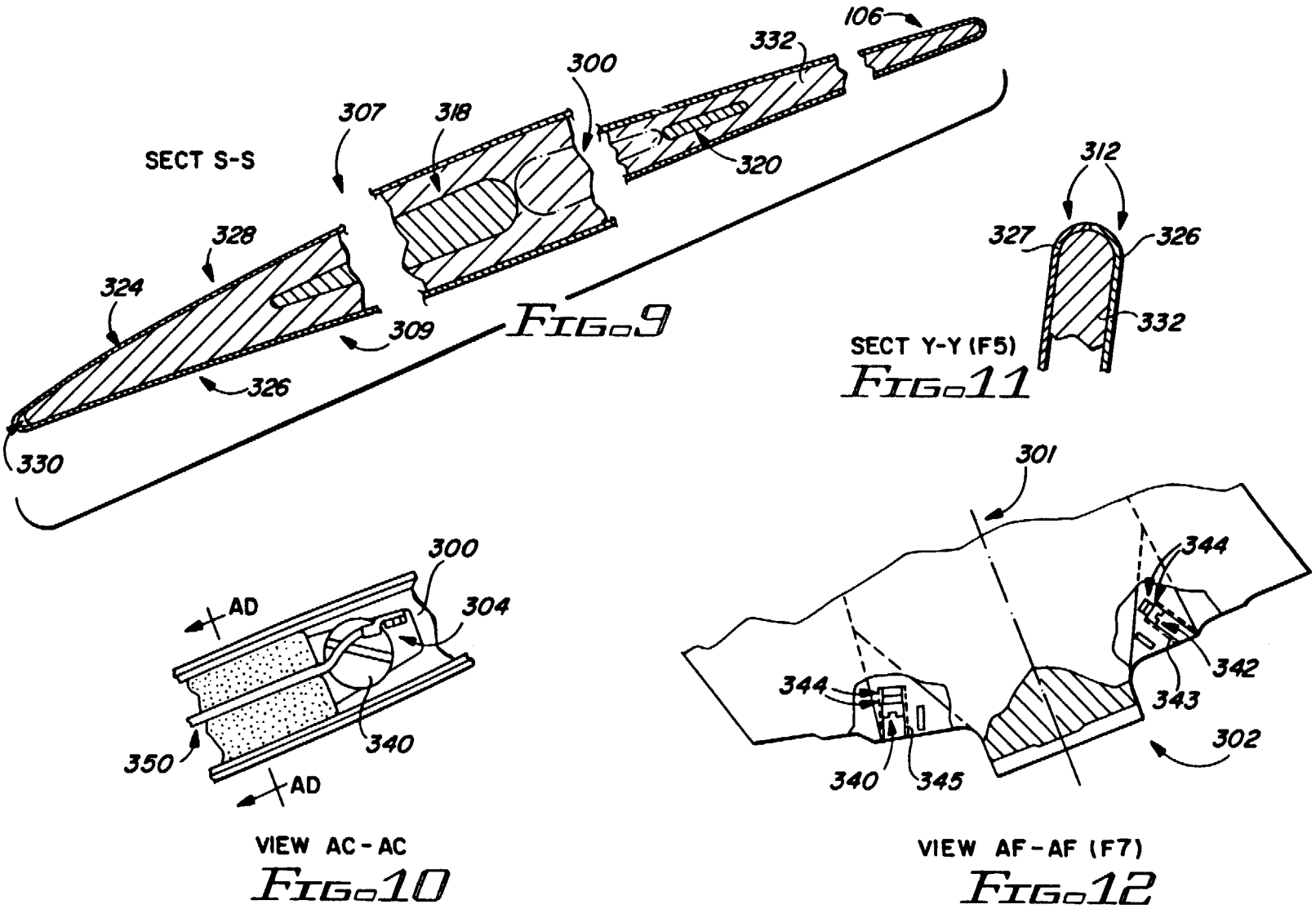
FIG. 9 is a section S—S of a fore blade.
FIG. 11 is the top end of a typical blade.
FIG. 12 is the root section of a typical blade illustrating the fore and aft balance weights.
FIG. 10 illustrates a grounding wire from the leading edge to the blade spar.

Referring to FIG. 9, there is shown a cross-sectional view of the blade 106 along the section S—S as shown in FIG. 2. The angle plied composite laminate surfaces 309 and 307 are shown as the diagonal area 332. The leading edge cavity 318 is positionally adjacent the blade spar 300 and is tapered in the leading edge direction. The trailing edge cavity 320 is shown positionally adjacent the trailing edge of the blade spar 300 and is slightly tapered toward the trailing edge of the blade 106. The nickel plate sheet 324 is bonded to leading edge 322 of blade 106. An epoxy matrix material 330 securely fastens the leading edge sheath 324 to leading edge 322 of blade 106.

Referring to FIG. 11, there is shown section Y—Y as illustrated in FIG. 2. The angle plied composite laminate 332 is secured on the tip end of the blade 106 by the nickel plate leading edge protector 324. The edge 326 abuts edge 327 of the leading edge protector 324 on tip 312 of the blade to protect the tip.

Referring to FIG. 12, there is shown the root section 302 of blade 106. The root section 302 includes dovetail 314 for securing the blade to a rotating hub. In general, the spar undercut cavities 304 and 306 contain weighted members in grooves 345 and 343 respectively, for statically balancing the blade about a radial and a chordwise moment axis. In spar cavity 304 is situated a fore balancing weight 340 in grooves 345. A balancing weight includes a weighted member having a component of movement in a radial direction along stacking axis 301 and a component of movement in a chordwise direction of blade 106. The member may be threaded for effecting movement. An aft balancing weight 342 in groove 345 has a component movement in a radial direction along stacking axis 301 and a component of movement in a chordwise direction of blade 106. The fore balancing weight 340 is positioned inside fore undercut cavity 304 of blade spar 300. The aft balancing weight 342 is positioned inside aft undercut cavity 306 of blade spar 300. Additional weights 344 can be added into either groove for adding weight to either undercut sections 304 or 306 for effecting a balancing of the blade.

FIG. 10 shows a wire 350 which is electrically connected to 'eading edge protector 324 and to blade spar 300. The wire is electrically connected to blade spar 300 in the fore undercut cavity 304. Wire 350 essentially grounds leading edge protector 324 to blade spar 300. Blade spare 300 is grounded to the aircraft frame by way of the aircraft propulsor system. The wire allows electricity to flow to the frame of the aircraft for preventing the buildup of electric charge on sheath 324. Additionally, FIG. 10 shows the bottom edge of fore balancing weight 340 inserted into fore the trailing edge undercut cavity 304 of blade spar 300.

3. Aft Blade

Figure 14:
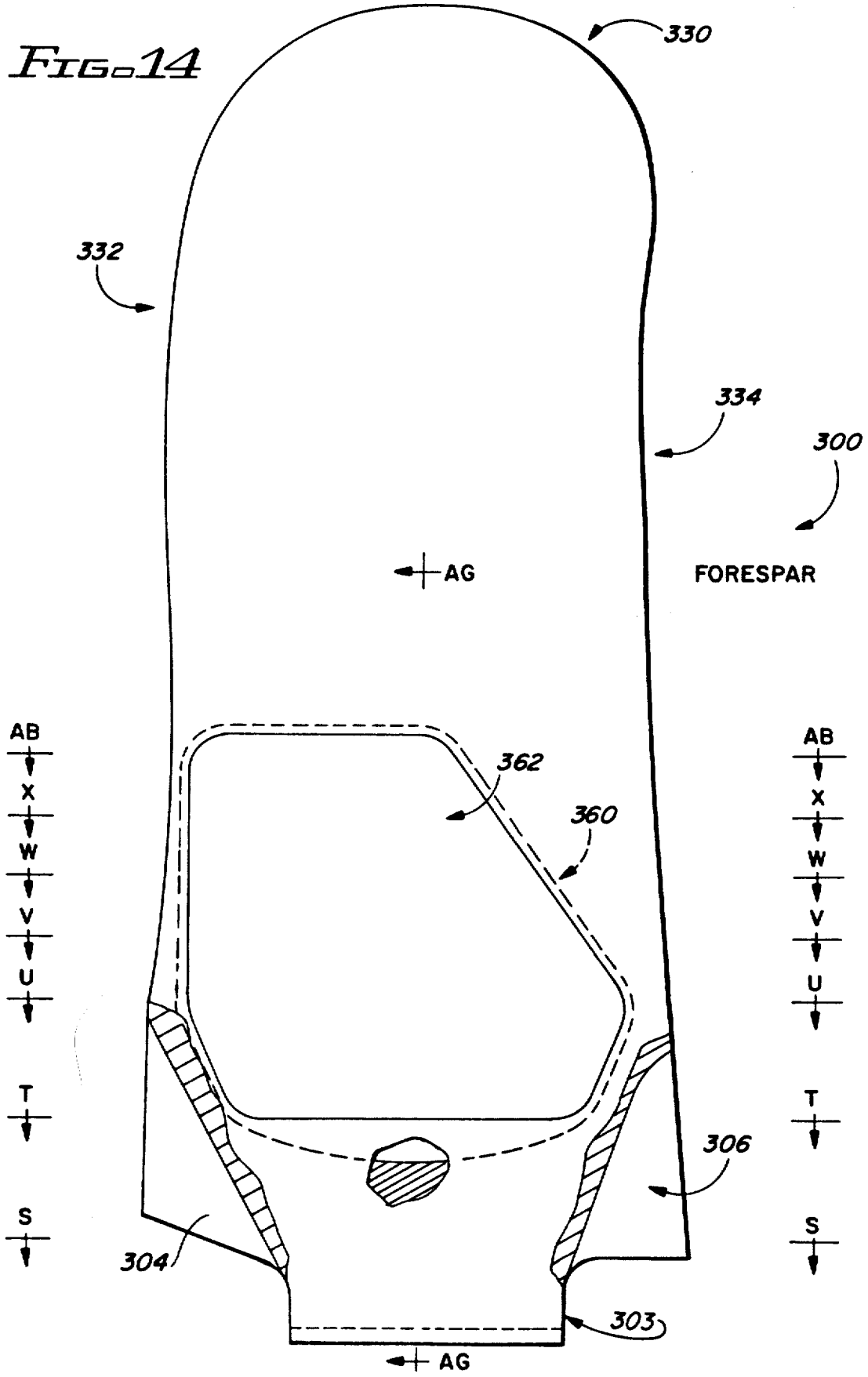
FIG. 14 shows the structure of a fore blade spar.

A blade, such as blade 108 of aft propulsor is illustrated in FIG. 14. In general, aft blade 108 is similar to fore blade 106 having an airflow section 410 including a tip end 412 and a root section 402. The airflow section 410 includes a leading surface 409 and a trailing surface 407 comprised of a plurality of angle plied composite laminates of continuous fibers which are embedded in a matrix material. The continuous fibers of the composite laminer extends across the entire airfoil. The aft blade 108 is constructed as the fore blade 106 and therefore the discussion of the blade construction is not repeated.

Figure 13:
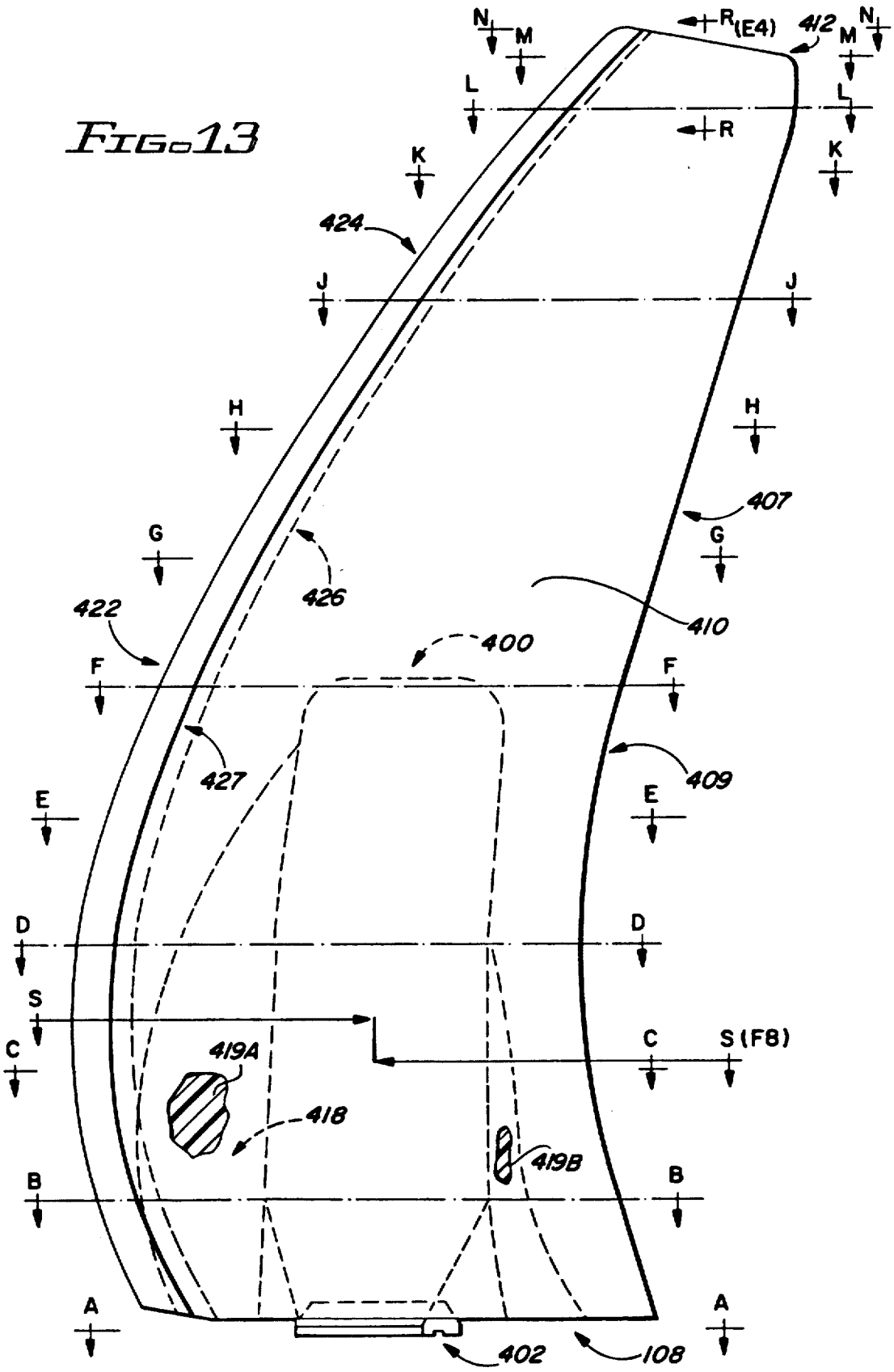
FIG. 13 is the structure of an aft blade.

The differences between aft blade 108 and fore blade 106 are dimensional and in the shape of leading edge cavity 418, trailing edge cavity 420 and the leading edge protector 422. The leading edge cavity 418, outlined by phantom lines in FIG. 13, is interposed between the shells as defined by surfaces 407 and 409 and positionally adjacent the leading edge of the blade spar 400. The trailing edge cavity 420, outlined by phantom lines in FIG. 13 is positionally adjacent the trailing edge of blade spar 400 and interposed between surfaces 407 and 409. As apparent from FIG. 2 and FIG. 13, due to the differences between the fore blade and aft blade, the leading and trailing edge cavities are thicker on the aft blade. The leading edge protector 422 of blade 108 is covered with a nickel plate sheath 424 preventing erosion and providing lightning strike protection. The sheath 424 is wider on leading surface 409 than on trailing surface 407 as shown by phantom line along the leading edge 422. The extension of leading edge protector on surface 409 provides greater protection for the leading edge 422, since leading surface 409 is the leading surface for cutting into the air, while trailing surface 407 does not impart the air during normal operation.

Blade 108 is swept back for reducing the noise generated at tip 412 and for decreasing the aerodynamic losses due to compressibility effects. The swept back configuration provides shock-free flow over the blade. The airflow shape is tailored for providing maximum efficiency at the cruise condition of mach 0.72 at 35,000 feet. However, the sweep of blade 108 may be varied depending upon the particular flight condition desired.

4. Blade Spar

Figure 15:
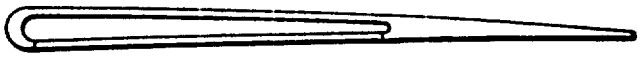
FIG. 15 illustrates the cross sections for a fore blade spar.
Figure 15:
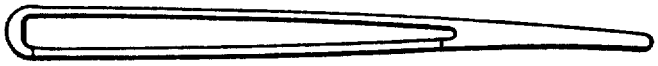
Figure 15:
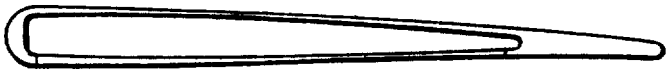
Figure 15:
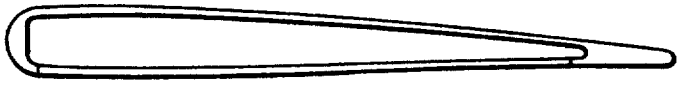
Figure 15:
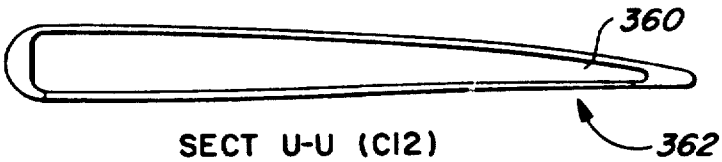
Figure 15:
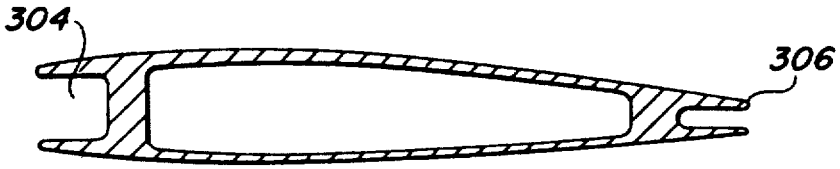
Figure 15:
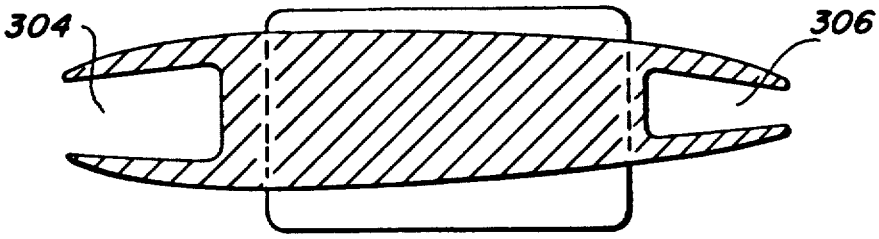

The structure of a typical blade spar for a fore blade is shown in FIG. 14. FIG. 15 shows cross cross sections of the blade spar 300 taken at various stations. For example, section T—T in FIG. 15 is taken along line T—T in FIG. 14. In general, a blade spar includes a tip end 330, a leading edge 332, a trailing edge 334, a fore undercut cavity 304, a aft undercut cavity 306, an a dovetail 303 for holding the blade in a rotating hub.

The blade spar 300 may include cavities for decreasing the weight of spar 300 while maintaining the surface area of spar 300. These cavities may take the form of hollowed areas that form pockets in the blade spar. In one form of the invention illustrated in FIGS. 14–19, the blade spar 300 includes a plate 362 which covers a hollow cavity 360 as outlined by the phantom line on FIG. 14. The cavity 360 is milled out, as by milling or by electrical chemical machining and the plate 362 is securely fastened over the cavity creating a blind cavity 360. In the practice of this invention, the applicant has found that plate 362 can be electron beam welded over a hollow cavity. The blind cavity 360 serves to decrease the weight of blade spar 300 while maintaining the surface area of the original blade spar, which is important to bonding to the rest of the blade. The cavities may also be formed in different areas and with different configurations.

In particular, referring to FIG. 15 the spar undercuts 304 and 306 are clearly depicted in section T—T and section S—S. The undercuts decrease the weight of the blade spar while maintaining the original surface area of the blade spar. The original surface area is maintained for adhesion to the angle plied composite laminates. As is apparent in FIG. 15, sections T—T through AB—AB clearly depict the blind cavity 360 formed from the blade spar by fastening plate 362 to the blade spar 300. As seen in FIG. 15 for undercavity 304 and aft undercut cavity 306 decrease the weight of blade 108 by eliminating material in the leading and trailing edge of the blade spar. As can be clearly seen, undercut 304 and 306 maintain the original airfoil surface area of the blade spar.

The balancing weights for the blade spar are positioned inside fore undercut cavity 304 and aft undercut cavity 306. For a detailed description of the balancing weights inside the blade spar, attention is directed to FIG. 18B in which the position and location of the balancing weights is depicted in greater detail.

Figure 16:
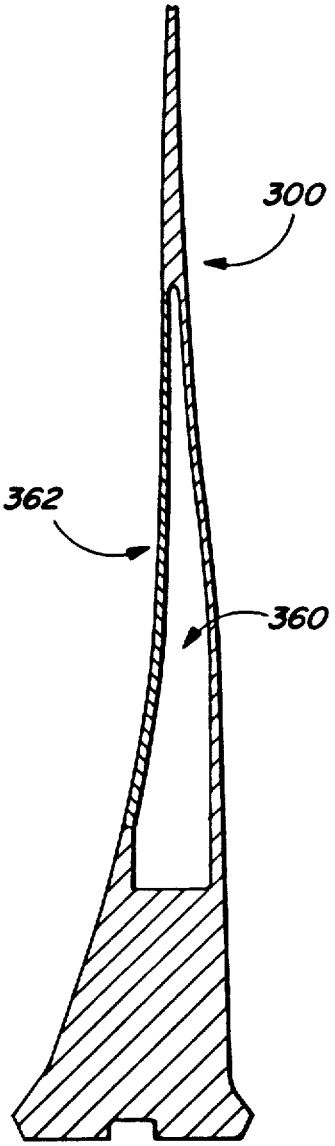
FIG. 16 is a diagram of the blade spar illustrating the blind cavity.

FIG. 16 shows blade spar 300 along view AG—AG. The shape of blind cavity 360 is clearly depicted. The plate 362 is firmly attached to blade spar 30 to form the triangular shaped blade cavity 360. The triangular blade cavity 360 decreases the weight of blade spar 300 while maintaining the surface area of blade spar 300.

Figure 19:
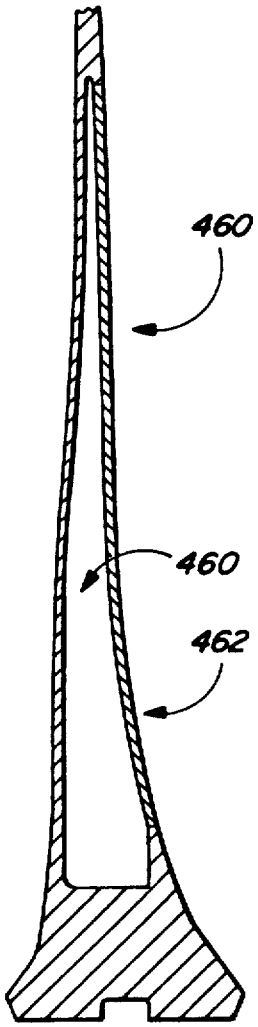
FIG. 19 illustrates the blind cavity for an aft blade spar.
Figure 18:
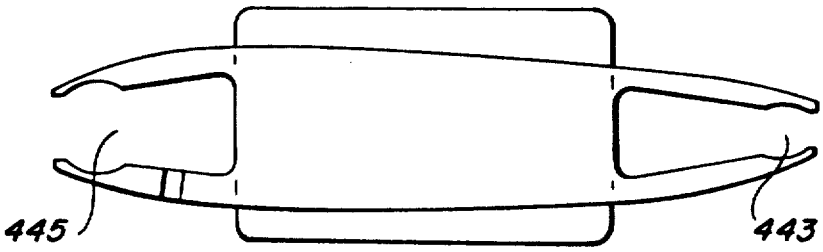
FIGS. 18 and 18A illustrate the cross sections for a aft blade spar.
Figure 17:
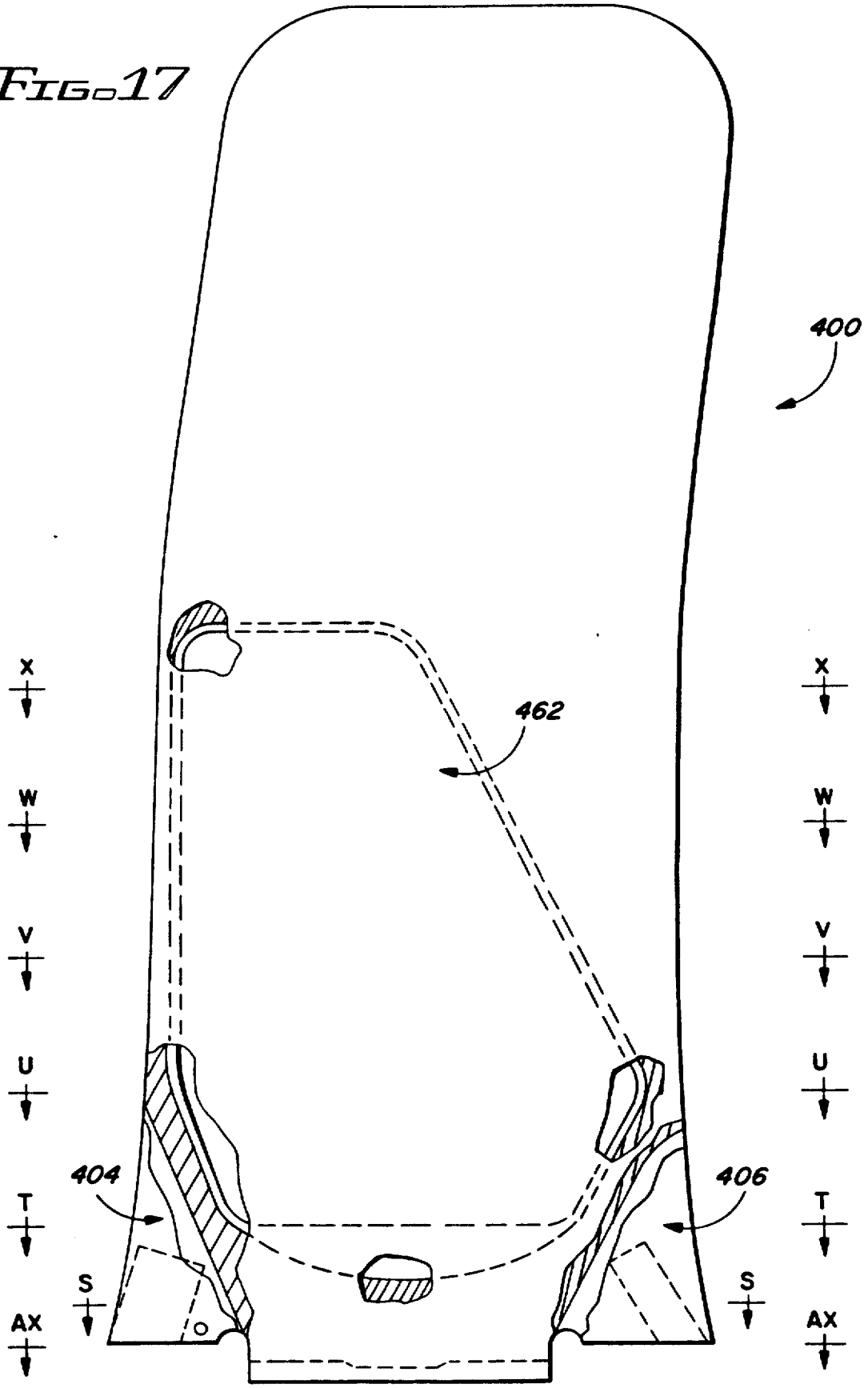
FIG. 17 shows the structure for an aft blade spar.
Figure 18A:
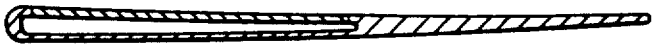
Figure 18A:
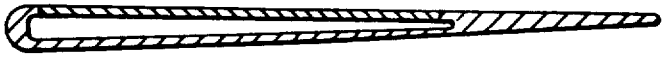
Figure 18A:
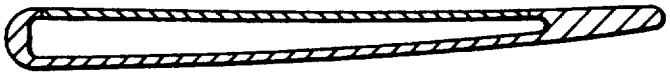
Figure 18A:
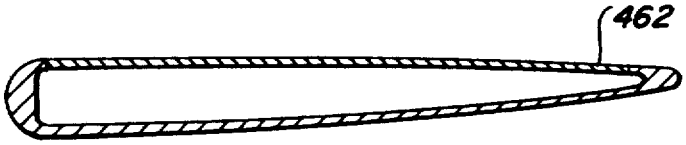
Figure 18A:
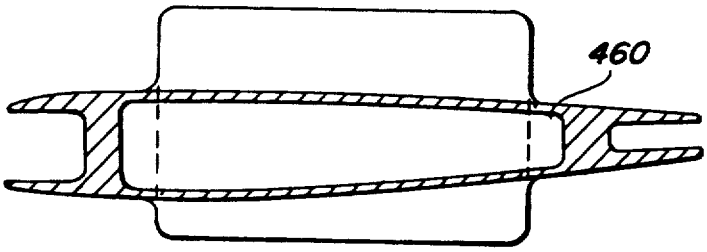
Figure 18A:
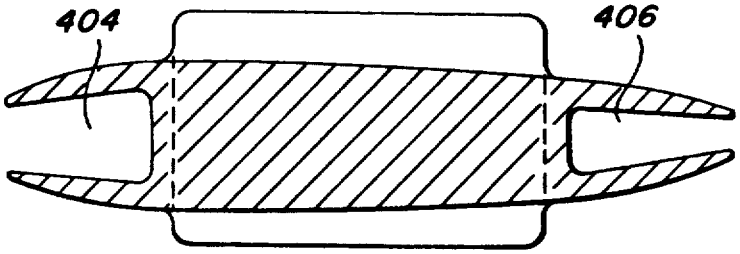

In general, FIGS. 17-19 illustrate the blade spar 400 for the aft blade 106. The blade spar 400 is constructed similar to blade spar 300 except for size and the shape of plate 462 and blind cavity 460. FIG. 17 shows a structure of a typical aft blade spar. FIGS. 18,18A show cross sections of blade spar 400 taken at various stations. For example, section T—T in FIG. 18A is taken along line T—T in FIG. 17.

Referring to FIGS. 18,18A there is depicted the blind cavity 460 formed by plate 462 which is electron beam welded to blade spar 400. The aft blade 108 includes fore undercut cavity 404 and aft undercut cavity 406 as depicted in FIG. 18 for decreasing the weight of blade spar 108. In FIG. 18A for groove 445 and aft groove 443 are depicted for securing fore balancing weights and aft balancing weights as discussed previously.

FIG. 19 illustrates blade spar 400 along line AK—AK as depicted in FIG. 17. Blind cavity 460 is formed by welding plate 462 to blade spar 460. Blind cavity 460 effects a decrease of weight in the blade spar while maintaining the surface area of the original blade spar 460. Blind cavity 460 is formed by milling or by electrochemical machining. Blade spare 400 and 300 are constructed so as to maintain the surface area of the original spar while decreasing the weight of the spar with cavities, such as undercut cavities and hollow cavities. The blade spar provides connection between the angle plied laminates, foam filled airfoil cavities and the dovetail, while providing a light weight load transfer mechanism.

Figure 20:
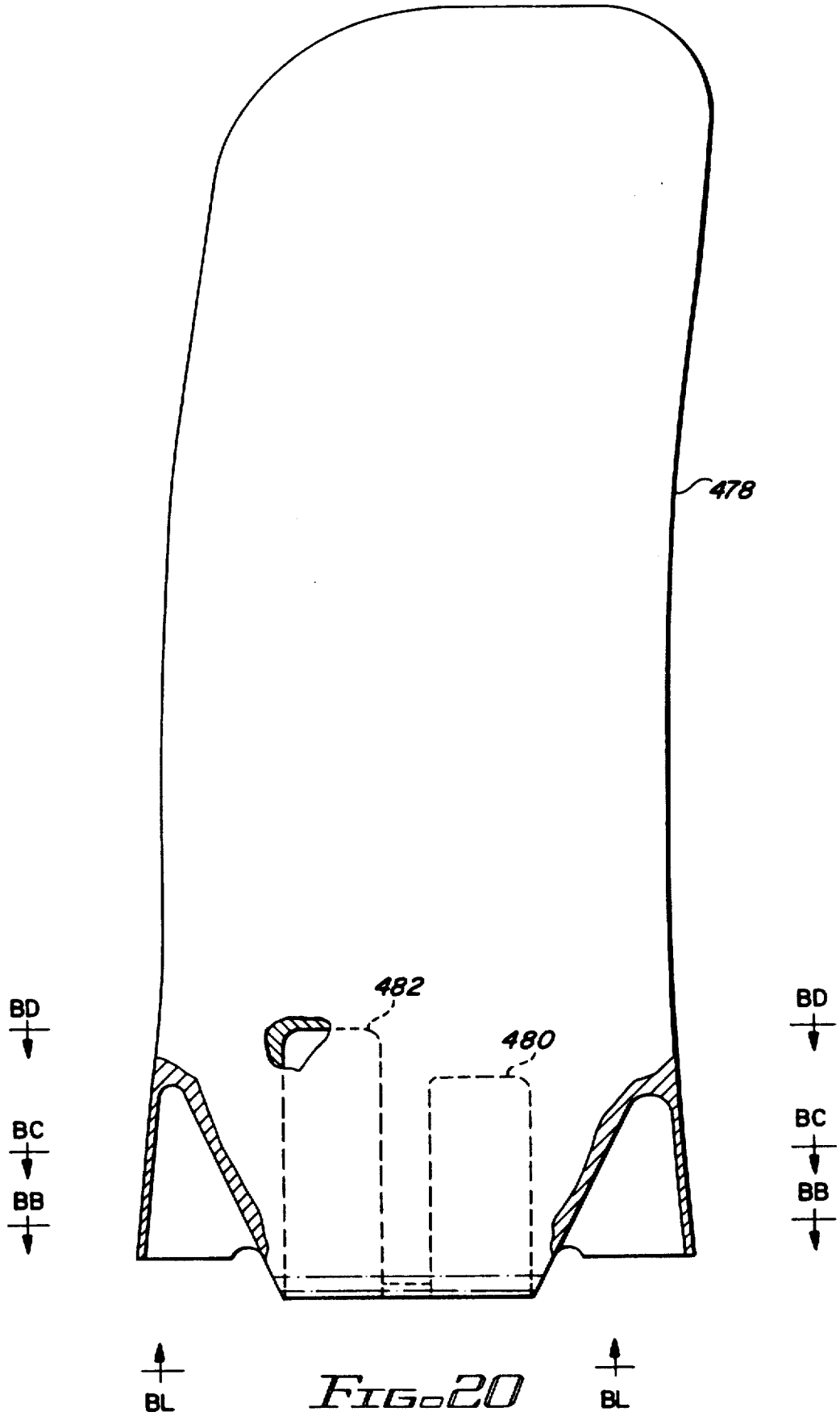
FIG. 20 illustrates aother form of the blade spar having different cavities.
Figure 21:
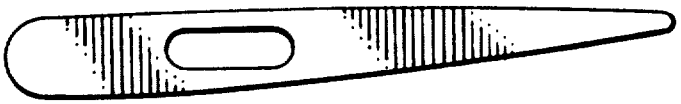
FIG. 21 illustrates cross-sections of the blade of FIG. 20.
Figure 21:
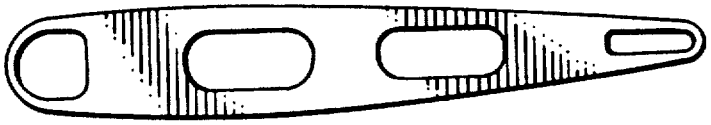
Figure 21:
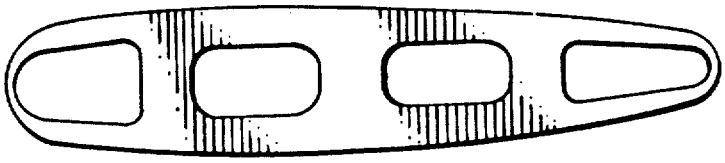
Figure 21:
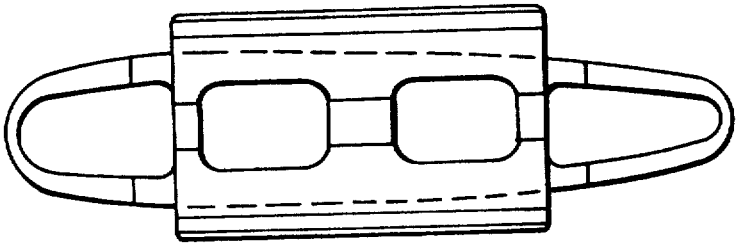

In another form of the invention, FIGS. 20-21 illustrate blade spar 478 having a plurality of spar cavities 480 and 482. FIG. 21 show cross sections of blade spar 478 taken at various stations. For example, section BB—BB is taken along BB—BB in FIG. 2. The cavities 482 and 480 are cut through the dovetail region and into the spar interior using electrodynamic milling. Thus, the additional welding of the plate to the spar is eliminated. The cavities decrease the weight of the spar while maintaining the surface bonding area.

Thus it has been shown an improved counterrotating aircraft propulsor system having highly swept, wide chord, thin blades in which each blade is radially and chordwise balanced for achieving a balanced blade. The sweep back design reduces shock and aerodynamic loss due to compressibility effects. The blade includes a blade spar for transferring load from the air foil to a rotating hub of the propulsor system. The spar includes cavities for decreasing the weight of the blade while maintaining the surface area of the spar.

The above described embodiment of the invention is illustrative only, and that modifications thereof may occur to those skilled in the art. Accordingly, this invention is not to be regarded as limited to the embodiment disclosed therein, but is to be limited as defined by the appended claims.

We claim:

1. A propulsor blade comprising:

an airfoil section having a top end, a root end, a first and second surface therebetween defining a convex shaped leading edge and a concave shaped trailing edge, said first surface being essentially convex and said second surface being essentially concave, each surface being formed of a plurality of angle plied composite laminates bonded together;

a metallic blade spar interposed between said first and second surfaces and bonded to said surfaces for connecting said surfaces to said root end;

a plurality of airfoil cavities interposed between said first and second surfaces and positionally adjacent to said blade spar for effecting a desired weight of said blade, said plurality of airfoil cavities including at least a first and a second airfoil cavity, the first airfoil cavity being positioned adjacent to the leading edge of said blade spar and the second airfoil cavity being positioned adjacent to the trailing edge of said blade spar; *and*

*a first balance weight and a second balance weight in said root end for statically balancing said blade about a chordwise moment axis and a radial moment axis.*

[2. The blade of claim 1, further comprising a first balance weight and a second balance weight in said root end for statically balancing said blade about a first and second moment axis.]

3. The blade of claim 1, wherein said blade spar includes a plurality spar cavities for decreasing the weight of said blade spar.

4. The blade of claim 3, wherein at least one of said spar cavities forms a pocket in one side of the blade spar.

5. The blade of claim 4, further comprises a cover plate fitted over said pocket and securely fastened to said blade spar forming a hollow spar cavity.

6. The blade of claim 2, wherein said spar cavities are enclosed within the interior of said spar for maintaining the surface area of said blade spar.

7. The blade of claim 6, wherein said spar cavities extend through said root end.

8. The blade of claim 3, wherein said blade spar includes a dovetail for holding said blade in a rotating hub, a first undercut cavity in the leading edge of said blade spar and a second undercut cavity in the trailing edge for decreasing the weight of said blade spar while maintaining the surface area of said blade spar.

9. The blade of claim 1, wherein said each airfoil cavity is filled with a low density foam for maintaining the airfoil shape and preventing water from entering the cavity.

10. The blade of claim 9, wherein said first balance weight and second balance weight are threaded members.

11. A propulsor blade comprising:

a plurality of angle plied composite laminates forming a first and second surface intersecting in a leading edge, a trailing edge nd a tip end, said leading edge and trailing edge being swept back for reducing noise generated at said top end and for decreasing aerodynamic losses due to compressibility effects of air.

a metallic spar interposed between said first and second surfaces and bonded to said surfaces for stiffening said surfaces, said spar having a tip end, a leading edge, a trailing edge and a dovetail;

a plurality of blade cavities interposed between said first and second surfaces for decreasing the weight of said blade;

positionally adjustable counterweights in the blade spar root, fore and aft of said dovetail for effecting a blade radial moment balance and a chordwise movement balance;

the airfoil shape of the blade being defined by the following table:

| SECT | SECT HEIGHT TH (M) (in.) BASIC | TWIST ANGLES TAN TT ±0°45' | TWIST ANGLES CHORD TC REF | THICKNESS LEAD. TL (in.) ±.005 | THICKNESS MAX TM ±.005 | THICKNESS TRAIL. TU (in.) ±.005 | OVERALL CHORD LG CH +.015 in. | LEAD. EDGE (in.) Min Rad LE Ref | TRAIL. EDGE (in.) RADIUS TE Ref |
|---|---|---|---|---|---|---|---|---|---|
| A—A | — | 20°15' | 19°56' | .399 | 1.934 | .247 | 17.711 | .036 | .087 |
| B—B | 4.026 | 19°21' | 19°9' | .324 | 1.475 | .200 | 17.891 | .030 | .073 |
| C—C | 8.052 | 21°16' | 21°12' | .238 | 1.003 | .154 | 17.967 | .024 | .059 |
| D—D | 12.078 | 24°43' | 24°43' | .166 | .673 | .119 | 17.935 | .020 | .047 |
| E—E | 16.104 | 27°41' | 27°42' | .132 | .540 | .098 | 17.699 | .018 | .038 |
| F—F | 20.130 | 30°12' | 30°13' | .123 | .508 | .086 | 17.123 | .017 | .031 |
| G—G | 24.155 | 32°40' | 32°42' | .113 | .446 | .079 | 16.201 | .016 | .029 |
| H—H | 28.181 | 35°07' | 35°12' | .097 | .352 | .073 | 15.060 | .014 | .028 |
| J—J | 32.187 | 37°30' | 37°36' | .085 | .284 | .071 | 13.803 | .013 | .029 |
| K—K | 36.233 | 39°55' | 40°4' | .080 | .237 | .069 | 11.980 | .012 | .028 |
| L—L | 38.246 | 41°16' | 41°26' | .079 | .213 | .070 | 10.693 | .011 | .028 |
| M—M | 40.081 | 43°39' | 43°52' | .077 | .189 | .071 | 8.890 | .010 | .028 |
| N—N | 40.952 | 45°31' | 45°42' | .080 | .180 | .072 | 7.710 | .009 | .029 |

12. A propulsor blade comprising:

a plurality of angle plied composite laminates forming a first and second surface intersecting in a leading edge, a trailing edge and a tip end, said leading edge and trailing edge being swept back for decreasing aerodynamic losses due to compressibility effects of air;

a metallic spar interposed between said first and second surfaces and bonded to said surfaces for stiffening said surfaces, said spar having a tip end, a leading edge, a trailing edge and a dovetail;

a plurality of blade cavities interposed between said first and second surfaces for decreasing the weight of said blade;

positionally adjustable counterweights in the blade spar root, fore and aft of said dovetail for effecting a blade radial moment balance and a chordwise moment balance;

the airfoil shape of the blade being defined by the following table:

| SECT | SECT HEIGHT TH (M) (in.) BASIC | TWIST ANGLES TAN TT +0°45' | TWIST ANGLES CHORD TC REF | THICKNESS LEAD. TL (in.) +.005 | THICKNESS MAX TM (in.) +.005 | THICKNESS TRAIL. TU (in.) ±.005 | CHORD LG CH +.015 in | EDGE (in.) Min Rad LE REF | EDGE (in.) RADIUS TE REF |
|---|---|---|---|---|---|---|---|---|---|
| A—A | — | 26 46' | 26 30' | .376 | 1.928 | .256 | 17.610 | .033 | .089 |
| B—B | 3.959 | 25 06' | 24 59' | .305 | 1.472 | .202 | 17.875 | .028 | .073 |
| C—C | 7.919 | 26 38' | 26 38' | .232 | 1.030 | .157 | 17.972 | .024 | .059 |
| D—D | 11.878 | 29 11' | 29 12' | .179 | .785 | .124 | 17.902 | .020 | .047 |
| E—E | 15.838 | 31 08' | 31 9' | .147 | .637 | .102 | 17.683 | .018 | .038 |
| F—F | 19.797 | 32 41' | 32 41' | .127 | .530 | .087 | 17.169 | .017 | .031 |
| G—G | 23.756 | 34 09' | 34 10' | .111 | .433 | .078 | 16.266 | .016 | .029 |
| H—H | 27.716 | 35 36' | 35 40' | .096 | .349 | .073 | 15.143 | .014 | .028 |
| J—J | 31.675 | 37 03' | 37 11' | .086 | .285 | .070 | 13.854 | .013 | .029 |
| K—K | 35.635 | 38 49' | 38 58' | .080 | .236 | .069 | 11.952 | .012 | .028 |
| L—L | 37.614 | 39 57' | 40 8' | .078 | .212 | .070 | 10.637 | .011 | .029 |
| M—M | 39.174 | 41 19' | 41 32' | .077 | .192 | .071 | 9.008 | .010 | .028 |
| N—N | 40.177 | 42 26' | 42 39' | .079 | .179 | .073 | 7.605 | .009 | .028 |

13. A propulsor blade comprising:

an airfoil section having a tip end, a root end, a first and second surface therebetween defining a convex shaped leading edge and a concave shaped trailing edge, said first surface being essentially convex and said second surface being essentially concave, each surface being formed of a plurality of angle plied composite laminates bonded together;

a metallic blade spar interposed between said first second surfaces and bonded to said surfaces for connecting said surfaces to said root end;

said blade spar including a plurality of spar cavities for decreasing the weight of said blade spar, said blade spar further including a dovetail for holding said blade in a rotating hub, a first undercut cavity in the leading edge of said blade spar and a second undercut cavity in the trailing edge for decreasing the weight of said blade spar while maintaining the surface area of said spar;

a plurality of airfoil cavities interposed between said first and second surfaces and positioned adjacent to said blade spar for effecting a desired weight of said blade;

a metallic leading edge protector having two superposed surfaces bonded to said leading edge from said tip end to said root end for preventing erosion of said leading edge;

a first balance weight and a second balance weight in said root end for statically balancing said blade about a first and second moment axis; and said first balance weight being positioned inside the first undercut and having a component of movement in a radial direction and a component of movement in a chordwise direction of said blade, said second balance weight being positioned within the second undercut and having a component of movement in a radial direction of said blade and a component of movement in a chordwise direction of said blade, said first and second balance weights effecting a balance of said blade about a chordwise moment axis and a radial moment axis.

14. A propulsor blade comprising:

a metallic blade spar having a blade support portion and a dovetail portion for attaching said spar to a rotating hub, said support portion having a leading edge and a trailing edge;

a plurality of angle plied composite laminates bonded together over said blade support portion for forming an airfoil section of said blade having a tip end, a root end, a leading edge and a trailing edge;

a first undercut cavity formed in the leading edge of said blade spar and a second undercut cavity formed in the trailing edge of said blade spar;

a first balance weight positioned inside said first undercut cavity and coupled to said blade spar so as to be movable in an angular direction with respect to said leading edge of said blade spar; and a second balance weight positioned inside said second undercut cavity and coupled to said blade spar so as to be movable in an angular direction with respect to said trailing edge of said blade spar, adjustment of the position of said first and second balance weights effecting a simultaneous balancing of said blade about both a radial moment axis through a center of said blade and a chordwise moment axis substantially parallel to said root end of said blade.

15. The blade of claim 14 wherein said blade spar includes a plurality of spar cavities formed therein for decreasing the weight of said spar.

16. The blade of claim 15 wherein said spar cavities extend through said root end.

17. A propulsor blade comprising:

a metallic blade spar having a blade support portion and a dovetail portion for attaching said spar to a rotating hub, said support portion having a leading edge and a trailing edge;

a plurality of angle plied composite laminates bonded together over said blade support portion for forming an airfoil section of said blade having a tip end, a root end, a leading edge and a trailing edge;

at least one undercut cavity formed in said blade spar adjacent said root end; and a balance weight positioned within said at least one undercut cavity and adjustably coupled to said blade spar so as to be movable in an angular direction with respect to said leading edge of said spar, adjustment of the position of said balance weight effecting a simultaneous balancing of said blade about a radial moment axis through a center of said blade and a chordwise moment axis substantially parallel to said root end of said blade.

* * * * *